(12) United States Patent  (10) Patent No.: US 9,093,107 B2
Fujihara et al.  (45) Date of Patent: Jul. 28, 2015

(54) CONTROLLING DATA WRITING OF TAPE RECORDING APPARATUS

(71) Applicant: International Business Machines Corporation, Armonk, NY (US)

(72) Inventors: Shinobu Fujihara, Tokyo (JP); Yutaka Oishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/548,229

(22) Filed: Nov. 19, 2014

(65) Prior Publication Data

US 2015/0146321 A1  May 28, 2015

Related U.S. Application Data

(63) Continuation of application No. 14/012,933, filed on Aug. 28, 2013, now Pat. No. 8,917,473.

(30) Foreign Application Priority Data

Sep. 21, 2012  (JP) ................................ 2012-208724

(51) Int. Cl.
*G11B 15/093* (2006.01)
*G11B 15/087* (2006.01)
(Continued)

(52) U.S. Cl.
CPC .......... *G11B 15/087* (2013.01); *G11B 5/00817* (2013.01); *G11B 15/093* (2013.01); *G11B 15/026* (2013.01)

(58) Field of Classification Search
CPC .. G11B 5/09; G11B 2220/90; G11B 5/00817; G11B 27/107; G11B 5/584; G11B 2220/93; G11B 20/10; G11B 27/032; G11B 20/1201; G11B 15/087; G11B 27/22; G11B 27/13; G11B 5/5504; H04L 12/64
USPC ........ 360/74.4, 72.3, 78.02, 77.12, 73.04, 31, 360/55, 75, 291, 261.3, 73.11, 73.14, 74.1
See application file for complete search history.

(56) References Cited

U.S. PATENT DOCUMENTS 6,025,967 A * 2/2000 Kuta et al. ...................... 360/69
6,075,678 A   6/2000 Saliba
(Continued)

FOREIGN PATENT DOCUMENTS

JP   2009099207 A   5/2009

OTHER PUBLICATIONS

Non-Final Office Action from U.S. Appl. No. 14/012,933, dated May 7, 2014.
(Continued)

*Primary Examiner* — Ali Neyzari
(74) *Attorney, Agent, or Firm* — Zilka-Kotab, PC

(57) ABSTRACT

A method according to another embodiment includes writing data on a tape medium in a direction from a first end toward a second end of the tape medium using a tape recording apparatus. The tape recording apparatus includes a magnetic head and is configured to record data on tape media. The method further includes wrap-turning the running direction of the tape medium before reaching the second end and writing a first portion of data remaining to be written when the data remaining to be written is smaller than a volume of the data to be written in one running of the tape medium so that an end of the data is written at a position close to the first end, and writing a second portion of data remaining to be written toward the first end.

20 Claims, 5 Drawing Sheets

(51) Int. Cl.
*G11B 5/008* (2006.01)
*G11B 15/02* (2006.01)

(56) References Cited

U.S. PATENT DOCUMENTS 6,128,150 A * 10/2000 Oguro et al. ............. 360/72.2
6,580,578 B1   6/2003 Tucker et al.
7,180,694 B2   2/2007 Kawashima et al.
8,917,473 B2  12/2014 Fujihara et al.
2014/0085746 A1  3/2014 Fujihara et al.
2014/0198638 A1  7/2014 Campbell et al.

OTHER PUBLICATIONS

Notice of Allowance from U.S. Appl. No. 14/012,933, dated Aug. 18, 2014.

* cited by examiner

CONTROLLING DATA WRITING OF TAPE RECORDING APPARATUS

RELATED APPLICATIONS

This application is a continuation of U.S. patent application Ser. No. 14/012,933 filed Aug. 28, 2013, which is herein incorporated by reference. The present application claims priority to Japanese Patent Application No. 2012-208724, filed Sep. 21, 2012, which is herein incorporated by reference.

BACKGROUND

The present invention relates to a tape recording apparatus (a tape drive) that records data in a tape medium (a tape) by running the tape medium back and forth in the longitudinal direction thereof.

In particular, it relates to a write controlling method that involves adjusting the timing of wrap-turning of the tape running direction depending on the amount of data in order to reduce the time required for positioning the tape in reading of any data.

Tape drives are superior to hard disk drives in energy consumption efficiency, that is, as a green storage.

In addition, in terms of data reading/writing performance, tape drives are comparable to hard disk drives.

However, tape drives are significantly inferior to hard disk drives in capability of positioning for data reading/writing.

According to a technique for a tape drive described in Japanese Patent No. JP2009-099207A, after a chunk of data is written on a tape medium, the part of the tape medium from the end of the chunk of data up to a position close to a predetermined position (LP3) at a first end of the tape medium is padded with dummy data before another chunk of data is written on the tape medium, thereby improving the positioning capability.

The technique described in Japanese Patent No. JP2009-099207A is effective for reducing the time required to move to the beginning of any data when the tape medium is inserted into the tape drive. However, the technique is not effective for reducing the time required to move to the beginning of any data after reading other data written on the tape medium.

BRIEF SUMMARY

According to one embodiment, a data write controlling method is provided that uses a tape storage apparatus that reduces the time required for positioning a tape medium prior to reading any data from the tape medium.

According this embodiment, the end of the data written on the tape medium is adjusted to be close to a predetermined position on the tape medium by changing the timing to wrap-turn the tape running direction. As a result, the capability of data positioning in reading the data written on the tape medium is dramatically improved.

A method according to one embodiment includes writing data on a tape medium in a direction from a first end toward a second end of the tape medium using a tape recording apparatus. The tape recording apparatus comprises a magnetic head and is configured to record data on tape media. The method further includes wrap-turning a running direction of the tape medium a first time when the magnetic head reaches the second end of the tape medium. Data is written on the tape medium in a direction toward the first end, and wrap-turning is performed on the running direction of the tape medium a second time when the magnetic head reaches the first end after the first wrap-turn and performing a subsequent data writing. Wrap-turning is again performed on the running direction of the tape medium a third time before reaching the second end and writing a first portion of data remaining to be written after the second wrap-turn when the data remaining to be written in the subsequent data writing is smaller than a volume of the data to be written in one running of the tape medium so that an end of the data is written at a position close to the first end, and writing a second portion of data remaining to be written after the second wrap-turn toward the first end.

A method according to another embodiment includes writing data on a tape medium in a direction from a first end toward a second end of the tape medium using a tape recording apparatus. The tape recording apparatus includes a magnetic head and is configured to record data on tape media. The method further includes wrap-turning the running direction of the tape medium before reaching the second end and writing a first portion of data remaining to be written when the data remaining to be written is smaller than a volume of the data to be written in one running of the tape medium so that an end of the data is written at a position close to the first end, and writing a second portion of data remaining to be written toward the first end.

DETAILED DESCRIPTION

Figure 1A:
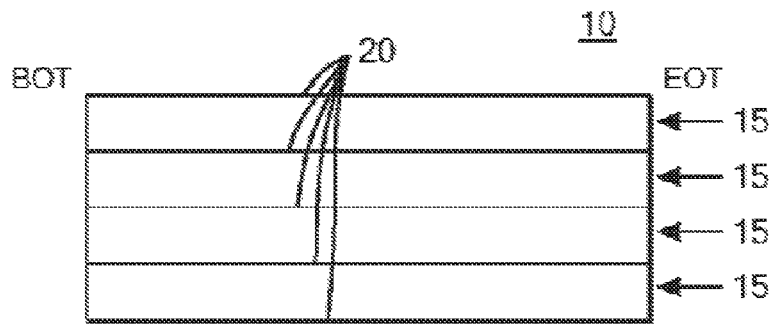
FIGS. 1(a)-1(c) show a data reading/writing format that involves repeatedly running a tape back and forth in the longitudinal direction, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a method for controlling data writing using a tape recording apparatus, wherein the tape recording apparatus includes a magnetic head and is configured to record data on a tape medium by running the tape medium back and forth in a longitudinal direction between opposite ends of the tape medium, includes performing back-and-forth data writing by positioning the magnetic head at a predetermined position close to a first end of the tape medium, writing the data on the tape medium starting from the predetermined position, wrap-turning a running direction of the tape medium a first time when the magnetic head reaches a second end of the tape medium, and writing the data on the tape medium from the second end toward the first end, wrap-turning the running direction of the tape medium a second time when the magnetic head reaches the first end after the first wrap-turn and performing a subsequent back-and-forth data writing, and wrap-turning the running direction of the tape medium a third time before the magnetic head reaches the second end and writing a first half of data remaining to be written after the second wrap-turn when the data remaining to be written in the subsequent back-and-forth data writing is smaller than a volume of the data to be written in one back-and-forth running of the tape medium so that an end of the data is written at a position close to the first end, and writing a second half of data remaining to be written after the second wrap-turn toward the first end.

In another general embodiment, a tape recording apparatus configured to record data on a tape medium by running the tape medium back and forth in a longitudinal direction between opposite ends of the tape medium, includes a controller configured to perform back-and-forth data writing by positioning a magnetic head of the tape recording apparatus at a predetermined position close to a first end of the tape medium, write the data on the tape medium starting from the predetermined position, wrap-turn a running direction of the tape medium a first time when the magnetic head reaches a second end of the tape medium, write the data on the tape medium from the second end toward the first end, wrap-turn the running direction of the tape medium a second time when the magnetic head reaches the first end after the first wrap-turn and perform subsequent back-and-forth data writing, and when an amount of data remaining to be written in the subsequent back-and-forth data writing is smaller than a volume of the data to be written in one back-and-forth running of the tape medium, wrap-turn the running direction of the tape medium a third time before the magnetic head reaches the second end when the first half of the amount of data remaining to be written after the second wrap-turn is written so that an end of the data is written at a position close to the first end, and write a second half of the data remaining to be written after the second wrap-turn toward the first end.

According to another general embodiment, a program configured to control data writing using a tape recording apparatus configured to record data on a tape medium by running the tape medium back and forth in a longitudinal direction between opposite ends of the tape medium causes a computer processor to perform back-and-forth data writing by positioning a magnetic head of the tape recording apparatus at a predetermined position close to a first end of the tape medium, write the data on the tape medium starting from the predetermined position, wrap-turn a running direction of the tape medium a first time when the magnetic head reaches a second end of the tape medium, and write the data on the tape medium from the second end toward the first end, wrap-turn the running direction of the tape medium a second time when the magnetic head reaches the first end after the first wrap-turn and perform subsequent back-and-forth data writing, and when an amount of data remaining to be written in the subsequent back-and-forth data writing is smaller than a volume of the data to be written in one back-and-forth running of the tape medium, wrap-turn the running direction of the tape medium a third time before the magnetic head reaches the second end when a first half of the amount of the data remaining after the second wrap-turn is written so that an end of the data is written at a position close to the first end, and write a second half of the data remaining to be written after the second wrap-turn toward the first end.

In order to reduce the time required for positioning a tape medium for reading any data from the tape medium, one embodiment provides a method for controlling data writing by a tape recording apparatus that records data on a tape medium by running the tape medium back and forth in a longitudinal direction between opposite ends of the tape medium. The method comprises performing back-and-forth data writing by positioning a magnetic head of the tape recording apparatus at a predetermined position close to a first end of the tape medium, writing the data on the tape medium starting from the predetermined position toward a second end of the tape medium, wrap-turning a running direction of the tape medium a first time when the magnetic head reaches a second end of the tape medium, and writing the data on the tape medium from the second end toward the first end, wherein the running direction of the tape medium is wrap-turned again when the magnetic head reaches the first end after the first wrap-turn and performing a subsequent back-and-forth data writing, and when the amount of remaining data to be written in the subsequent back-and-forth data writing is smaller than a volume of the data to be written in one back-and-forth running of the tape medium (the volume of the data to be written in the wraps involved in the back-and-forth writing; that is, the end of the data (EOD) does not reach the first end after wrap-turn), dynamically wrap-turning the running direction of the tape medium before the magnetic head reaches the second end when the first half of the amount of the remaining data after the wrap-turn is written so that the EOD is written at a position close to the first end, and writing the second half of the remaining data toward the first end.

The controlling method, in one embodiment, may further comprise receiving a value of the volume of all the data to be written from a host apparatus, and calculating the amount of data to be written on the tape medium that remains from the value of the volume of all of the data to be written.

The controlling method, in another embodiment, may further comprise receiving the value of the volume of all of the data using the tape recording apparatus by receiving a special command from the host apparatus along with the data.

The controlling method according to another embodiment may comprise calculating the amount of the remaining data from the value of the volume of all of the data using an application in a host apparatus, and receiving a special command from the host apparatus that indicates a timing to dynamically perform the wrap-turn (a position at which the dynamic wrap-turn occurs) using the tape recording apparatus.

The controlling method in yet another embodiment may comprise starting the back-and-forth running of the data writing at a predetermined position (LP3) following servo data adjacent to the first end (LP2).

The controlling method, according to another embodiment, may comprise calculating the amount of the remaining data from the value of the volume of all of the data each time the back-and-forth writing is completed.

In another embodiment, the controlling method may comprise calculating the amount of the remaining data when the value of the volume of all of the data is received.

According to yet another embodiment, the controlling method may comprise calculating the amount of the remaining data by taking into consideration an allowance margin (a loss capacity) that may occur due to a write error correction.

Moreover, the controlling method in one approach may include writing the second half of the remaining data after the dynamic wrap-turn, if the EOD being written does not reach the first end, dummy data is written up to a position close to the first end.

Additionally, the controlling method is characterized in that the tape medium has a plurality of bands extending in the longitudinal direction of the tape medium, each of the bands has a plurality of wraps (tracks) extending in the longitudinal direction, and the back-and-forth data writing is performed on pairs of the wraps (tracks).

Furthermore, in another embodiment, a tape recording apparatus comprises a magnetic head and is configured to record data on a tape medium by running the tape medium back and forth in a longitudinal direction between opposite ends of the tape medium, and a controller of the apparatus is configured to perform back-and-forth data writing by positioning the magnetic head of the tape recording apparatus at a predetermined position close to a first end of the tape medium, writing the data on the tape medium starting from the predetermined position toward a second end of the tape medium, wrap-turning a running direction of the tape medium when the magnetic head reaches the second end of the tape medium, and continuing to write the data on the tape medium from the second end toward the first end. The controller may further be configured to wrap-turn the running direction of the tape medium when the magnetic head reaches the first end after the first wrap-turn and perform subsequent back-and-forth data writing, and when the amount of the remaining data to be written in the subsequent back-and-forth data writing is smaller than a volume of the data to be written in one back-and-forth running of the tape medium (the volume of the data to be written in the tracks involved in the back-and-forth writing, that is, the EOD does not reach the first end after wrap-turn), wrap-turn the running direction of the tape medium before the magnetic head reaches the second end when the first half of the amount of the remaining data after the second wrap-turn is written so that the EOD is written at a position close to the first end, and write the second half of the remaining data toward the first end.

Furthermore, in another approach, a program that controls data writing using a tape recording apparatus that records data on a tape medium is configured to run the tape medium back and forth in a longitudinal direction between opposite ends of the tape medium. The program is configured to cause a computer processor to perform back-and-forth data writing by positioning a magnetic head of the tape recording apparatus at a predetermined position close to a first end of the tape medium, write the data on the tape medium starting from the predetermined position toward a second end of the tape medium, wrap-turn a running direction of the tape medium when the magnetic head reaches the second end of the tape medium, and write the data on the tape medium from the second end toward the first end, wrap-turn the running direction of the tape medium when the magnetic head reaches the first end after the first wrap-turn and perform a subsequent back-and-forth data writing, and when the amount of the remaining data to be written in the subsequent back-and-forth data writing is smaller than a volume of the data to be written in one back-and-forth running of the tape medium (the volume of the data to be written in the tracks involves in the back-and-forth writing, that is, the EOD does not reach the first end after wrap-turn), wrap-turn the running direction of the tape medium before the magnetic head reaches the second end when the first half of the amount of the remaining data after the second wrap-turn is written so that the EOD is located at a position close to the first end, and write the second half of the remaining data toward the first end.

In the following, modes for carrying out specific embodiments are described. However, the embodiments are not intended to limit the present invention which is only defined by the claims.

In particular, a writing method in one embodiment writes a relatively large amount of data (a motion picture file, for example) on a tape medium a tape drive so as to reduce the time required for positioning the tape drive in data reading. The writing method according to this embodiment is described in a context where a host apparatus (a host) sends data to a tape recording apparatus (a tape drive). The timing of wrap-turning of the direction of running of the tape medium is dynamically determined during data writing in order to position the trailing end of write data, that is, the EOD of write data, at a predetermined position on the tape medium (the tape).

Figure 1B:
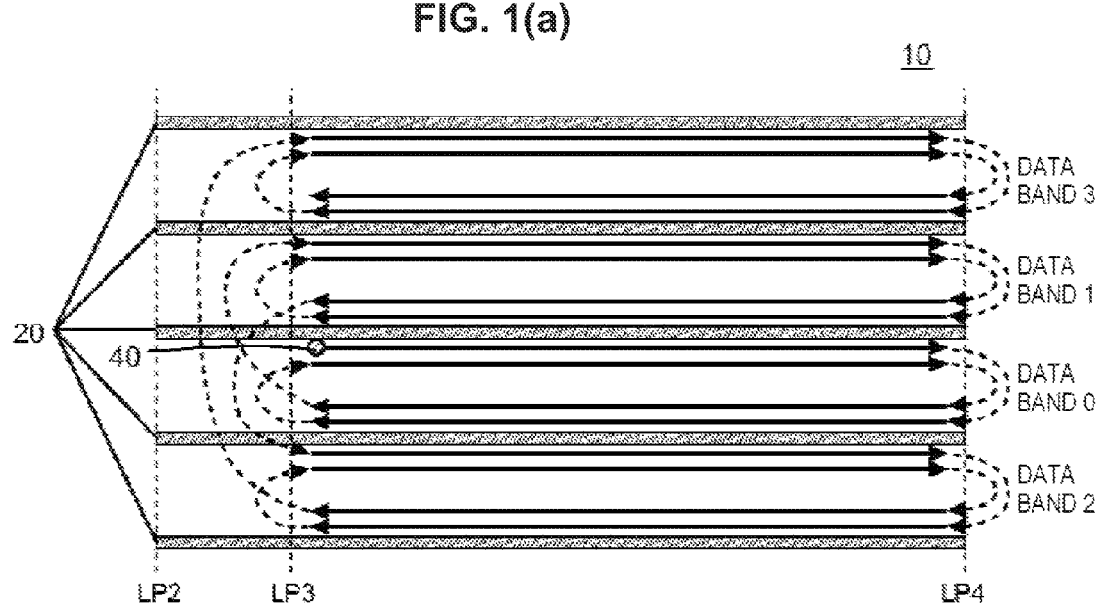
Figure 1C:
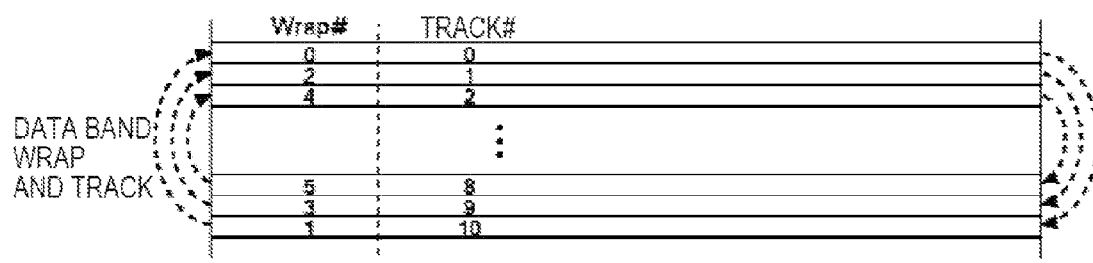

FIGS. 1(a)-1(c) show a data reading/writing format that involves repeatedly running a tape back and forth in the longitudinal direction. When sequentially writing data on a tape medium, the tape drive starts writing the data from the beginning of the tape.

An LTO (Linear Tape Open) or IBM TS1120 tape drive uses the data reading/writing format that involves repeatedly running a tape back and forth in the longitudinal direction.

According to the existing format, the direction of running of the tape is always changed or wrap-turned at a predetermined position, such as either of the longitudinal ends thereof or a position close thereto (LP3 or LP4).

In the following, embodiments are described in the context of a tape recording apparatus complying with the LTO standard as an example. However, the application of the present invention is not limited to a tape recording apparatus complying with the LTO standard or a host apparatus connected to the tape recording apparatus. Embodiments may be effectively applied to any tape recording apparatus that records data on a tape medium by running the tape medium back and forth in the longitudinal direction.

Referring to FIG. 1(a), a configuration of a recording region of a tape medium complying with the LTO standard and a data writing method is described. As shown, a tape medium 10 has a plurality of bands 15 extending in the longitudinal direction of the tape medium 10 from the beginning of the tape (BOT) to the end of the tape (EOT). A servo track 20 for controlling the data write position extends in the longitudinal direction along each side of each of the plurality of bands 15.

FIG. 1(b) shows that the tape drive does not start writing data from a logical position 2 (LP2) at the beginning of the tape medium 10 (BOT) but from a position slightly behind LP2, which is shown as LP3. When sequentially writing data on the tape medium 10 having such a recording region configuration, the tape recording apparatus complying with the LTO standard starts writing data from the beginning of the tape medium 10.

When writing data on the tape medium 10 for the first time, the tape recording apparatus starts writing data from a position close to LP3 on a data band 0, which is denoted by reference numeral 40 in FIG. 1(b), and continues writing data toward LP4. Once data is written to the end of the tape medium 10, the tape recording apparatus wrap-turns the tape running direction so that the tape runs in the direction from LP4 to LP3 as shown by an arrow in FIG. 1(b), and continues writing data. If additional data is to be written, the tape recording apparatus starts writing the additional data from a position adjacent to the last written data (the last data having already been written) on the tape medium 10.

The various tape positions described above may be stored in a nonvolatile memory, such as a cartridge memory (CM), equipped in the tape apparatus. Each region in which data is written in the direction from LP3 to LP4 or the direction from LP4 to LP3 is referred to as a wrap. The plurality of wraps are identified by identification numbers. The wrap may be referred to also as a data track (or a track). The operation of changing (such as reversing) the tape running direction is referred to as wrap-turn or wrap-turning. When writing data on the tape medium, the tape drive reconstructs data having a variable length sent from a host into a unit having a fixed length referred to as a data set (DS). Each DS includes metadata or meta information about the DS, such as a data set information table (DSIT).

When writing data on the tape medium for the first time, the tape drive starts writing the data from a position close to LP3 in a wrap numbered "0" (Wrap#0). When writing additional data, the tape drive starts writing the additional data from a position adjacent to the last written data. When overwriting existing data with the additional data, the tape drive starts writing the additional data from the beginning of data to be overwritten. The tape drive is a sequential access device and therefore cannot place data at an arbitrary position to improve the access speed.

In accessing data other than the first written data, the beginning of the data is located at an arbitrary position. In other words, the beginning of the data is not always located at a position close to LP3. Therefore, tape positioning takes a long time conventionally. According to the LTO standard, it takes about two minutes to move the magnetic head from a current position LP3 to a position close to LP4.

The tape recording apparatus, which is a sequential access device, sequentially records data on the tape medium 10 by running the tape medium 10 back and forth in the longitudinal direction. Accordingly, data other than the first written data begins at an arbitrary position on the tape medium 10. Therefore, in reading data or in writing new data, the data to be read or the new data to be written may not begin at the beginning of the tape medium 10. If the data to be read or the new data to be written does not begin at the beginning of the tape medium 10, the tape medium 10 needs to be run to a desired position, and thus, tape positioning takes a long time.

FIG. 1(c) shows a wrap structure or track structure of one data band accessed by a magnetic head having a one reading/writing channel. One data band includes eleven wraps or tracks. The one magnetic head accesses the eleven tracks by changing the tape direction. First, the magnetic head accesses the outermost physical track as shown by an arrow in the drawing. When the magnetic head reaches the end of the track, that is, the end of the tape, the magnetic head changes the tape direction and accesses a track on the other side as shown by an arrow. In this way, each time the magnetic head reaches the end of the tape, the magnetic head changes direction and accesses an inner track in the opposite direction.

The track number (track#) is an identification number that depends on the physical position on the tape medium, and the wrap number (Wrap#) is an identification number assigned to the physical position on the tape medium in the order of access.

If Wrap# is an even number, reading/writing occurs in the direction from LP3 to LP4. If Wrap# is an odd number, reading/writing occurs in the direction from LP4 to LP3. In the writing method according to one embodiment described below, a chunk of data read/written in one back-and-forth writing is expressed by a pair of wraps numbered by an even number and an odd number, such as Wrap#0 and Wrap#1. Specifically, a chunk of data read/written in one back-and-forth writing is expressed as a pair of wraps numbered 2*N and 2*(N+1), for example. A DS, which is a unit of reading/writing, is stored. Note that the symbol "*" represents multiplication.

Figure 2:
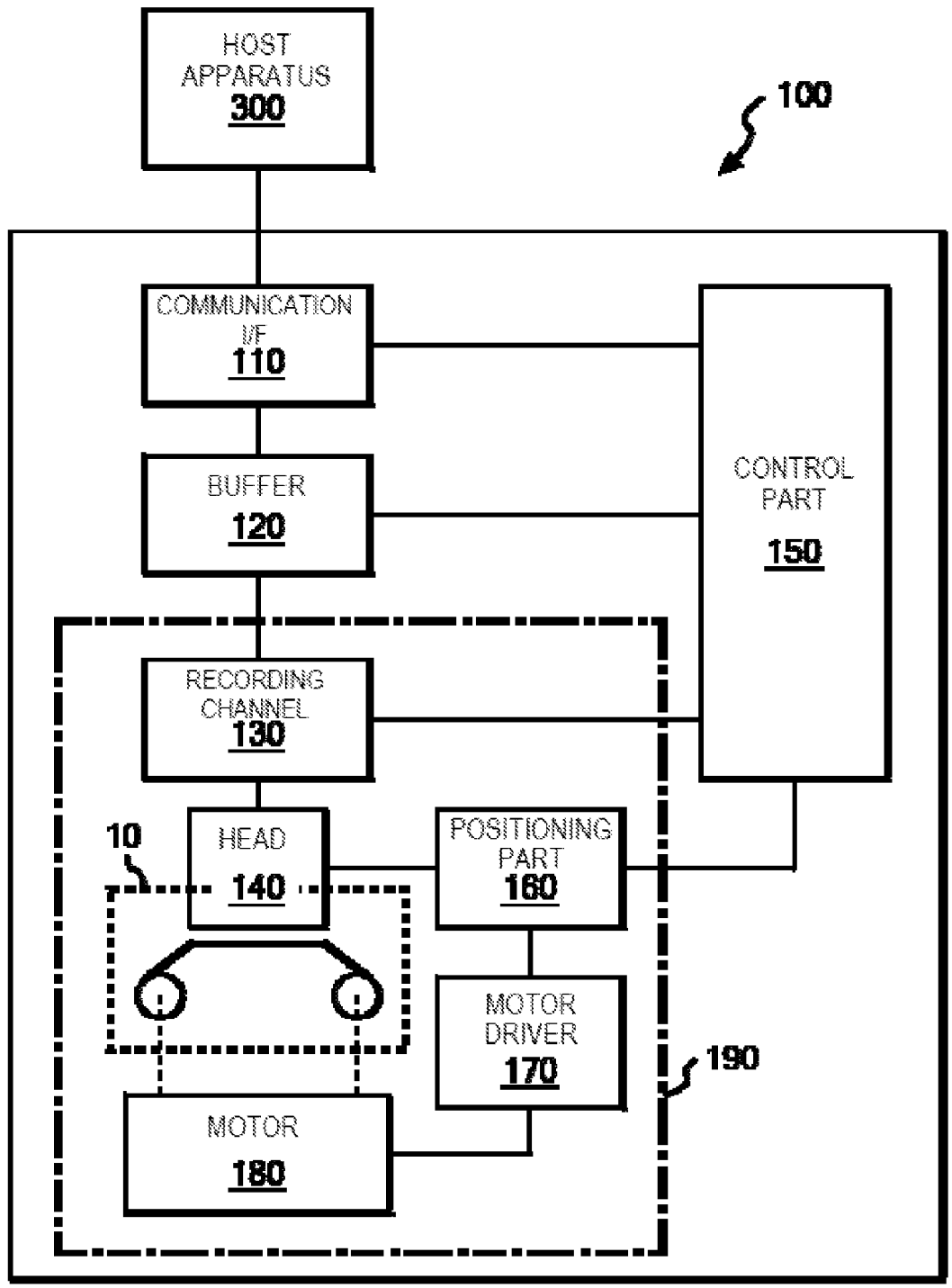
FIG. 2 shows an example of a hardware configuration of a tape recording apparatus according to one embodiment.

FIG. 2 shows an example of a hardware configuration of a tape storage apparatus 100 to which an embodiment is applied. The tape storage apparatus 100 includes an interface 110, a buffer 120, a recording channel 130, a read/write head 140, a controller 150, a positioning part 160, a motor driver 170 and a motor 180.

The communication interface 110 communicates with a host apparatus 300 over a network. For example, the interface 110 receives a write command to write data on the tape medium 10 from the host apparatus 300. The interface 110 also receives a read command to read data from the tape medium 10 from the host apparatus 300.

The buffer 120 is a memory that temporarily stores data to be written on the tape medium 10 or data read from the tape medium. For example, the buffer 120 may be a dynamic random access memory (DRAM). The recording channel 130 is a communication channel used to write data stored in the buffer 120 on the tape medium 10 or to temporarily store data read from the tape medium 10 in the buffer 120.

The read/write head 140 has a data read/write element, and writes data on the tape medium 10 and reads data from the tape medium 10. The read/write head 140 according to this embodiment has a servo read element and reads a signal from a servo track provided in the tape medium 10. The positioning part 160 issues an instruction to move the read/write head 140 in the lateral (width) direction of the tape medium 10. The motor driver 170 drives the motor 180.

The controller 150 controls the whole of the tape recording apparatus 100. More specifically, the controller 150 controls writing of data on the tape medium 10 and reading of data from the tape medium 10 according to a command received by the interface. Furthermore, the controller 150 controls the positioning part 160 according to a signal read from the servo track. Furthermore, the controller 150 controls the operation of the motor via the positioning part 160 and the motor driver 170. The motor driver 170 may be directly connected to the controller 150. The recording channel 130, the read/write head 140, the positioning part 160, the motor driver 170 and the motor 180 will be collectively referred to as a tape drive 190.

In addition to serving the functions described above, the controller 150 according to this embodiment controls the tape running direction to dynamically wrap-turn during data writing in such a manner as to ensure that the EOD being written on the tape medium 10 is located at a position close to the beginning of the tape medium 10. This function will be described in detail later with reference to drawings. The controller 150 may be implemented by a CPU, a RAM and/or a ROM, not shown. The ROM stores programs for making the controller 150 serve the above-described functions after activation, including a boot program executed by the CPU to activate the tape recording apparatus 100 or a control program according to this embodiment. The CPU executes these programs using the RAM.

Next, an example of a functional configuration of the controller 150 of the tape recording apparatus 100 according to one embodiment will be described.

The controller 150 according to this embodiment determines the timing of dynamically wrap-turning the running direction of the tape medium 10. The position in the wrap or track at which wrap-turn occurs is determined in such a manner as to ensure that the EOD being written on the tape medium 10 is located at a position close to the beginning (LP3) of the tape medium 10.

The controller 150 acquires the volume of data sent to the tape recording apparatus 100 (tape drive). Specifically, the volume of data may be acquired by receiving a special command from the host. An application in the host sends a series of a plurality of records, and the tape drive writes, on the tape medium, a plurality of records as one piece of data in units of DS. Since the host has acquired the volume of all of the data, the host may issue the special command to inform the tape drive of the volume of all of the data at a predetermined timing in the course of sending the plurality of records to the tape drive.

For example, when the host apparatus 300 and the tape recording apparatus 100 communicate with each other in accordance with the SCSI protocol, the special command may be provided by using a region referred to as Vendor Specific. For a Write command, bits 7 and 6 of byte 5 may be prepared as the Vendor Specific region. Alternatively, a new ID may be provided for a Send Diagnostic command, and the command may be used as the specific command. Alternatively, the special command may be provided as an entirely new command. The special command may be provided in any way.

In the tape recording apparatus 100 having received the special command, the controller 150 performs each required processing to bring the beginning of the data to be written to the beginning of the tape medium 10.

The controller 150 marks the data so as to make it obvious when the data is to be read that the data has been dynamically wrap-turned at a predetermined position in the wrap. The DS described above has two regions: a data region and a DSIT region. The data region is literally a region in which data is recorded, and the DSIT region is a region in which the content of the data region is described.

The controller 150 may use bit 1 of data set flags included in the DSIT. If the bit 1 of the data set flags is set, the tape recording apparatus 100 understands that the DS has been written by wrap-turning the running direction of the tape medium in a wrap of the last back-and-forth data writing. Therefore, by keeping the bit 1 set, the controller 150 may use the DS written last on the tape medium 10 as data written by dynamically wrap-turning the tape running direction in the last back-and-forth writing. Since the bit 1 is set, the data written by dynamically wrap-turning the tape running direction has to be read by wrap-turning the tape running direction at a predetermined timing.

To determine the timing to wrap-turn in the course of the last back-and-forth writing, the size of the data to be written in the last back-and-forth writing (the amount of the remaining data) is calculated from the volume of the whole data. The size of the remaining data is smaller than the amount of data written in one back-and-forth writing.

Figure 3A:
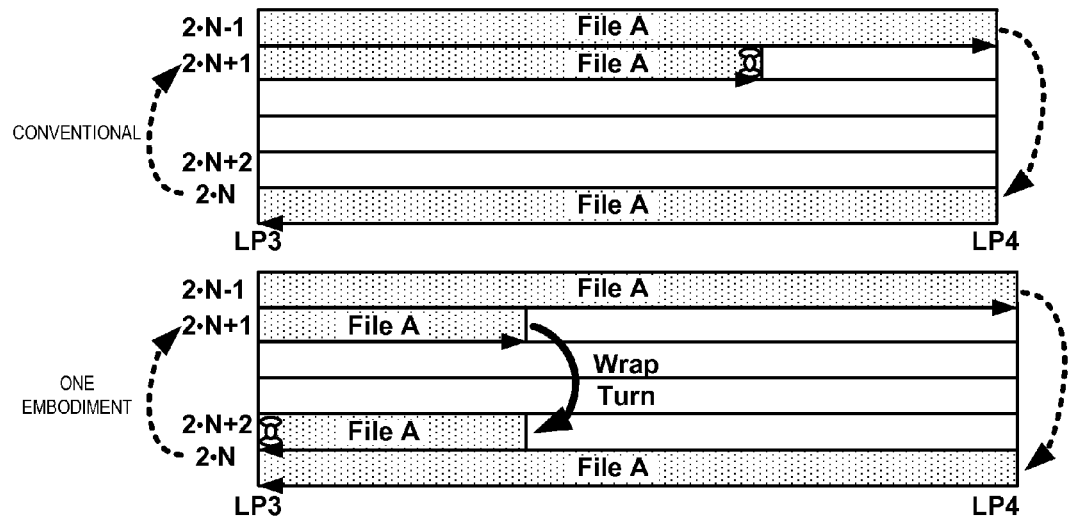
FIGS. 3(a)-3(b) are diagrams that illustrate methods of writing data in two wraps of a tape medium by wrap-turning the tape running direction.
Figure 3B:
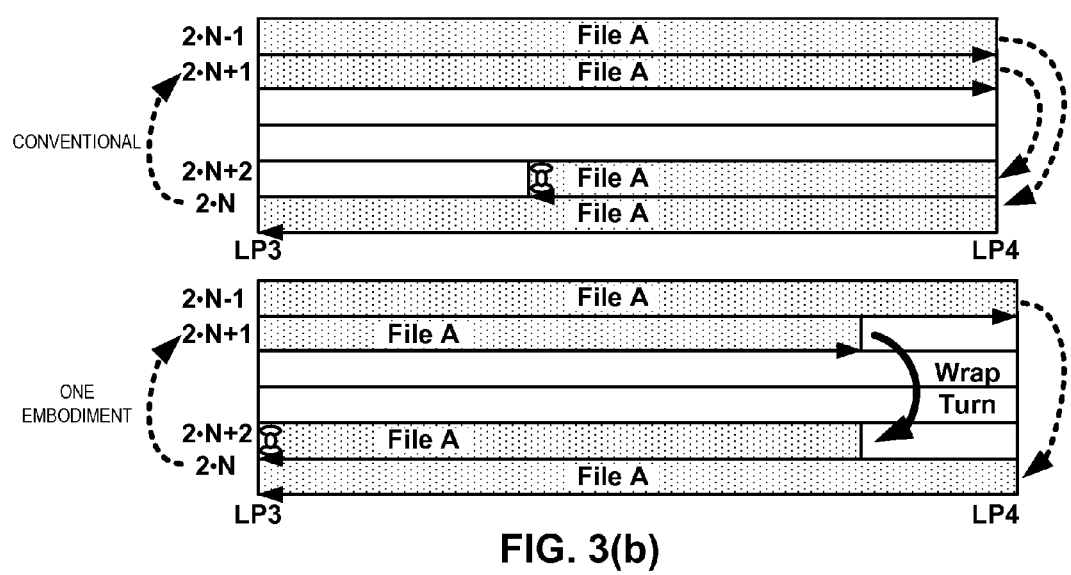

FIGS. 3(a)-3(b) illustrate ways of writing data in two wraps of the tape medium by wrap-turning the tape running direction. The "back-and-forth writing" is defined as an operation of writing data in two wraps assigned with successive odd and even numbers by wrap-turning the running direction of the tape medium. FIGS. 3(a)-3(b) show two cases that differ in the amount of the remaining data (2*Z) to be written in the last back-and-forth writing after a plurality of back-and-forth writings.

FIG. 3(a) shows a case where the amount of the remaining data (2*Z) is smaller than the capacity Y of a wrap, that is, 2*Z<Y. FIG. 3(b) shows a case where the amount of the remaining data "2*Z" is equal to or greater than the capacity Y of a wrap and smaller than the amount of data written in one back-and-forth writing (2*Y), that is, Y≤2*Z<2Y.

For both FIGS. 3(a) and 3(b), the upper half shows a conventional wrap-turn during writing, and the lower half shows a wrap-turn during writing according to one embodiment.

In both lower halves of FIGS. 3(a) and 3(b), if the amount of the remaining data (2*Z) is smaller than the amount of data to be written in one back-and-forth data writing (2*Y), the running direction of the tape medium is wrap-turned at a position in the wrap corresponding to a half of the amount of the remaining data, so that the end of the data being written (EOD) is located at a specified position (LP3) close to a first end.

It is supposed that the volume of the data to be written is denoted by X, and the recording capacity of a wrap is denoted by Y. The volume of data to be written in one back-and-forth data writing is 2*Y. The volume X of the data to be written satisfies a relation Y*(2*N)<X≤Y*(2*(N+1)), and the number of times N of the back-and-forth writings is always uniquely determined according to this relation.

The "volume X of the data to be written" does not refer to the volume of a record exchanged between the tape drive and the host through one write command (Write), that is, the volume of a fragment of File A. "Data (file)" refers to relatively large data, such as a video file. More specifically, write data (a write file) in one embodiment is a set of records of a video. The host sends each record to the tape drive in such a manner that it may be discriminated from the others by a command. Therefore, the host calculates the volume X of the data of File A, which is a set of records.

In order to bring the EOD to LP3, the data may be normally written in the first 2*N wraps in the region between LP3 and LP4. Then, in the course of writing the data in the (2*N+1)-th wrap, the tape running direction may be wrap-turned when an amount Z of data expressed by the following formula is written (that is, before reaching LP4).

$$Z=(Y-D)*(1+E)/2$$

In the formula, D represents the volume of data written in the first 2*N wraps, and E represents a decrease in recording capacity due to error correction in writing. For example, if a tape medium having a capacity of 1.03 GB is needed to write 1 GB of data, the value of E is 0.03. Depending on the format, the tape medium typically has a margin of about 3%, and even if about 3% of the capacity of the tape medium is used for error correction in writing, a specified volume of data for the tape medium may be written on the tape medium. If the error occurrence frequency in writing is low, and LP3 is not reached when the data is completely written, the remaining region up to LP3 may be padded with dummy data.

FIG. 3(a) shows a case where the amount 2*Z of the remaining data of File A after the back-and-forth writing in the wraps numbered 2*N−1 and 2*N+1 is smaller than the capacity Y of a wrap (2*Z<Y).

The upper half shows a conventional writing method, in which all of the amount 2*z of the remaining data is written in the wrap numbered 2*N+1, and the EOD does not reach a second end (LP4) of the tape medium.

The lower half shows the writing method according to one embodiment, in which when the first half Z of the amount of the remaining data is written in the wrap numbered 2*N+1, the running direction of the tape medium is wrap-turned. Then, the second half Z of the amount of the remaining data is written in the wrap numbered 2*N+2, so that the EOD is located at the first end (LP3).

FIG. 3(b) shows a case where the amount 2*Z of the remaining data of File A after the back-and-forth writing in the wraps numbered 2*N−1 and 2*N+1 is equal to or greater than the capacity Y of a wrap and smaller than the capacity 2*Y of the wraps involved in one back-and-forth writing (Y≤2*Z<2Y).

The upper half shows a conventional writing method, in which all of the amount of the remaining data is written in the wraps numbered 2*N+1 and 2*N+2. The EOD does not reach the first end (LP3) of the tape medium.

The lower half shows the writing method according to one embodiment, in which when the first half of the amount of the remaining data is written in the wrap numbered 2*N+1, the running direction of the tape medium is dynamically wrap-turned. Then, the second half of the amount 2*Z of the remaining data is written in the wrap numbered 2*N+2, so that the EOD is located at a predetermined position (LP3) close to the first end.

As can be seen from the lower halves of FIGS. 3(a) and 3(b), according to one embodiment, the position at which data writing starts and the position of the end of the data written (EOD) are a predetermined position (LP3) on the tape medium close to the first end thereof. The positions have different wrap identification numbers but coincide in the longitudinal direction. In the case of sequential reading of relatively large data (a video file, for example) written on the tape medium, the positioning time (seek time) required to move to the beginning of the next piece of data after reading of a piece data may be reduced in most cases.

According to one embodiment, since the tape running direction is wrap-turned at an arbitrary position not reaching LP4, a mechanism is used to record, in the tape medium, information that allows the tape drive to detect that the tape running direction has been wrap-turned at that position when reading the data from the tape medium. This may be achieved by recording, in the CM, information about the position of wrap-turn in each wrap when the data is written. Alternatively, the DSIT of the last DS written in each wrap may include a flag that indicates that the DS is the last DS in the wrap, the flag may be set at an appropriate value when the data is written, and the value of the flag may be referred to, when the data is read, to determine whether the DS is the last DS in the wrap or not.

Figure 4:
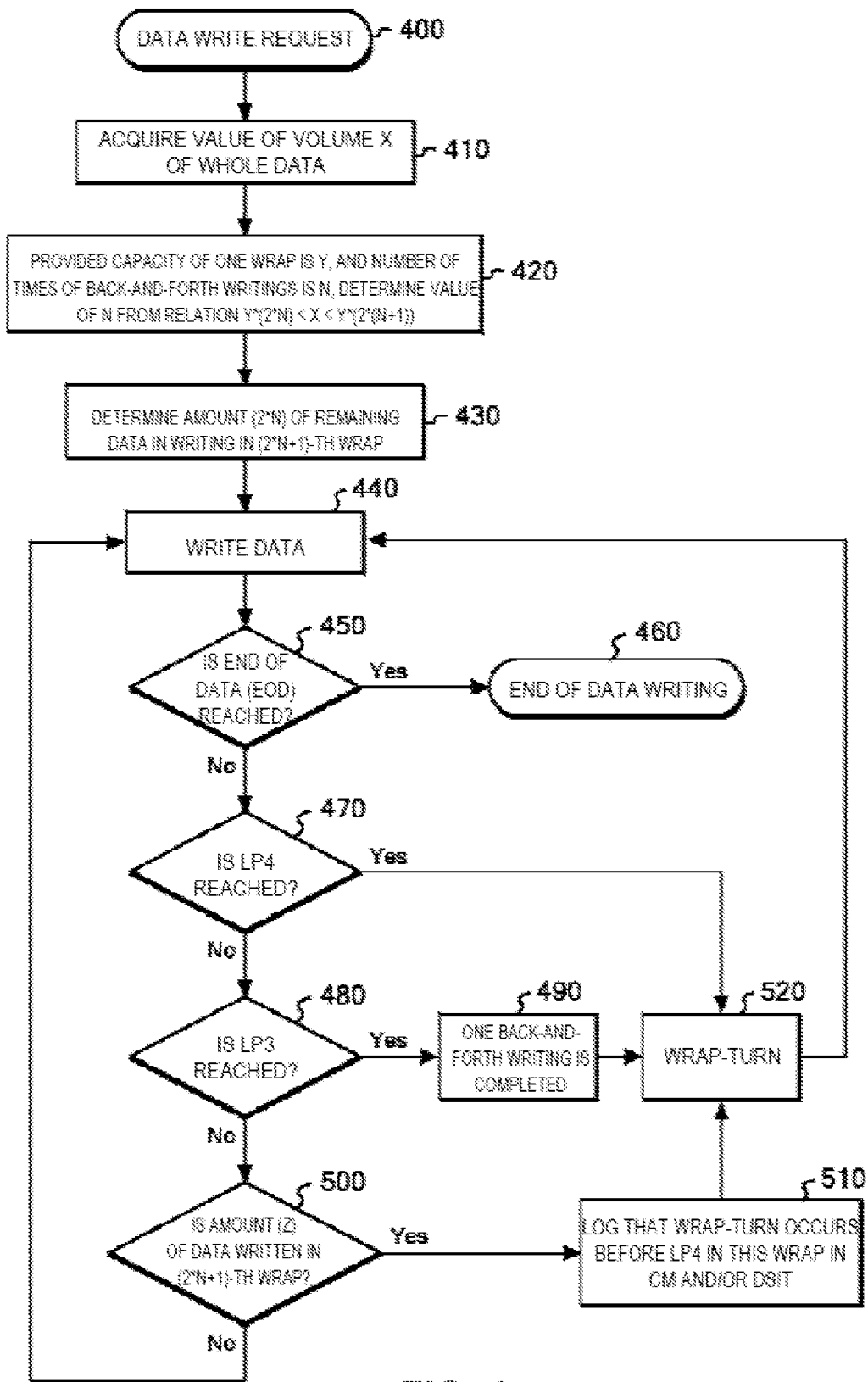
FIG. 4 shows flow of a writing method according to an embodiment.

FIG. 4 shows a flow of the writing method according to an embodiment. The flow of steps 500, 510 and 520, in which the running direction of the tape medium is dynamically wrap-turned, is particularly interesting. The wrap-turn occurs when a half of the amount 2*Z of the remaining data after several back-and-forth data writings (in step 490) is written. The end of the data written (EOD) in the 2*(N+1)-th wrap is located at a position close to LP3. The order of the steps shown in the figure is just an example, and the ordering of the steps is not so limited.

In step 400, the tape drive receives a data write request from the host. The host sends a write command to write a plurality of records and requests the tape drive to manage and record the plurality of records as one piece of data (file).

In step 410, the tape drive acquires the value of the volume X of all of the data from the host. The tape drive may acquire the value of the volume X of all of the data by receiving a special command issued by the host. Since an application in the host manages the plurality of records, the host may compile the records and calculate the value of the volume X of all of the data from the records to be sent as a file. As an alternative to the method in which the tape drive acquires the value of the volume X of the data from the host, the host may calculate the timing of wrap-turn from the value of the volume X of all of the data and inform the tape drive of the timing of wrap-turn in the course of writing the records by issuing the special command.

In step 420, the tape drive determines the number of times N of the back-and-forth writings from the value of the volume X of all of the data. Provided that the capacity of a wrap is Y, the volume of the data written in one back-and-forth writing is 2*Y. Alternatively, the host may calculate these values. The tape drive may perform N back-and-forth writings of the data sent from the host, N being determined by X and Y.

In step 430, the tape drive determines the amount (2*Z) of the remaining data to be written in the 2*(N+1)-th wrap after the data is written in the 2*N-th wrap by back-and-forth writing. Alternatively, the host may calculate the data amount.

In step 440, the tape drive writes a plurality of records having a variable length on the tape medium in units of DS having a fixed length. The tape drive starts writing data on the tape medium in the direction from LP3 toward LP4. Then, when LP4 on the tape medium is reached (in step 470), the tape running direction is wrap-turned (in step 520), and then, the data is written in the direction toward LP3. When LP3 on the tape medium is reached (in step 480), writing of the data in the wraps during the back-and-forth writing is completed (in step 490).

In step 450, if the EOD is reached when the data is written on a specific wrap (Yes), writing of the data is completed (in step 460). If writing of a DS including a subsequent record is not completed (No), writing of the data continues.

In step 470, if writing of the data continues, and the second end (LP4) of the tape medium is reached, the tape running direction is wrap-turned (in step 520).

In step 480, if writing of the data continues, and the first end (LP3) of the tape medium is reached, the current back-and-forth writing is completed (in step 490). The tape running direction is wrap-turned again (in step 520).

In step 490, in the case of a relatively large video file or the like, an amount 2*Z of remaining data after a plurality (N) of back-and-forth writings, is written in the last pair of wraps 2*N+1 and 2*(N+1).

In step 500, the tape drive checks whether a half of the amount (2*N) of the remaining data is written in the (2*N+1)-th wrap, in order to ensure the timing to wrap-turn the tape running direction. If a half (Z) of the amount (2*Z) of the remaining data is written in the (2*N+1)-th wrap of the tape (Yes), the tape running direction is wrap-turned even if LP4 has not been reached yet (in step 520).

In step 510, the tape drive logs in the CM or DSIT that a wrap-turn has occurred in the (2*N+1)-th wrap (in step 510). When the log is to be saved in the DSIT, for example, the log may be saved by providing a new flag that indicates that the DS immediately before the wrap-turn is the last DS in the (2*N+1)-th wrap. When the log is to be saved in the CM, a combination of the wrap and the longitudinal position (LPOS) on the tape may be logged. Alternatively, the wrap-turn of the tape running direction may be indicated by a data set number (DS#) or a record number (record#) included in the DS associated with the wrap number 2*(N+1).

In step 520, when the tape running direction is wrap-turned, the second half Z of the remaining data (2*Z) is written in the wrap numbered 2*(N+1). The position of the EOD is located at the predetermined position (LP3) in the wrap numbered 2*(N+1) close to the first end.

Figure 5:
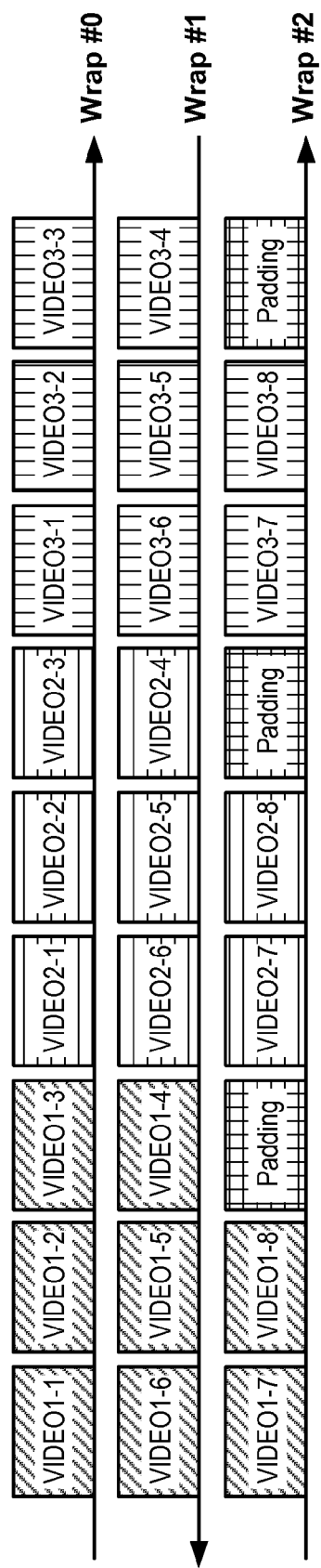
FIG. 5 is a diagram illustrating a method for writing data sent from a plurality of hosts in such a manner that the data is easily accessed by a host.

FIG. 5 is a diagram illustrating a method of writing data sent from a plurality of hosts in such a manner that the data may be easily accessed on a host basis.

According to one embodiment, the data sent from the plurality of hosts may be gathered in their respective specified regions arranged along the length of the tape in order to allow the data to be managed on a host basis. Alternatively, a file for each host may be written by wrap-turning the tape running direction before reaching LP4 or LP3. More specifically, in a case of writing videos x-* (*=1, 2, 3, . . . ) sent from hosts x (x=1, 2, 3 . . . ) as shown in FIG. 5, the positions at which wrap-turn occurs may be dynamically determined so that wrap-turns occur at different positions in different wraps.

In FIG. 5, the left end of a video 1-1 is located at LP3, and LP4 is located several tens of meters to the right of the right end of a video 3-3, for example. According to a conventional writing method, in order to bring the end of a large file of a series of videos sent from a host that requires a plurality of wraps to LP4, the series of videos is wrap-turned at an arbitrary position. According to one embodiment, as shown in FIG. 5, videos 1-1 to 1-6 are regarded as one virtual file. And even if the right end of the video 3-3 does not reach LP4, the tape running direction is wrap-turned to bring the end of the virtual file (EOD) to LP3.

According to this embodiments described above, after data written on the tape medium is read, the time (seek time) required for positioning at the beginning of the next data may be reduced.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." For example, one approach may include a processor and logic integrated with and/or executable by the processor, the logic being configured to perform various operations. Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, or as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present invention has been described with reference to embodiments thereof, the scope of the present invention is not limited to the embodiments described above. It would be obvious to those skilled in the art that various modifications may be made and various alternatives may be adopted without departing from the spirit and scope of the present invention.

What is claimed is:

1. A method, comprising:
    writing data on a tape medium in a direction from a first end toward a second end of the tape medium using a tape recording apparatus, wherein the tape recording apparatus comprises a magnetic head and is configured to record data on tape media;
    wrap-turning a running direction of the tape medium a first time when the magnetic head reaches the second end of the tape medium;
    writing the data on the tape medium in a direction toward the first end;
    wrap-turning the running direction of the tape medium a second time when the magnetic head reaches the first end after the first wrap-turn and performing a subsequent data writing; and
    wrap-turning the running direction of the tape medium a third time before reaching the second end and writing a first portion of data remaining to be written after the second wrap-turn when the data remaining to be written in the subsequent data writing is smaller than a volume of the data to be written in one running of the tape medium so that an end of the data is written at a position close to the first end, and writing a second portion of data remaining to be written after the second wrap-turn toward the first end.

2. The method according to claim 1, further comprising:
    receiving a value of a volume of all of the data from a host apparatus; and
    calculating an amount of data remaining to be written on the tape medium from the value of the volume of all of the data.

3. The method according to claim 2, wherein the calculating the amount of data remaining to be written comprises calculating from the value of the volume of all of the data each time the writing is completed.

4. The method according to claim 2, further comprising:
    receiving, using the tape recording apparatus, the value of the volume of all of the data by receiving a special command from the host apparatus along with the data.

5. The method according to claim 4, wherein the calculating the amount of data remaining to be written comprises calculating when the value of the volume of all of the data is received.

6. The method according to claim 2, wherein the amount of data remaining to be written is calculated by taking into consideration an allowance margin for a possibility of occurrence of a write error correction.

7. The method according to claim 2, wherein a host apparatus calculates the amount of data remaining to be written from the value of the volume of all of the data, and wherein the tape recording apparatus receives a special command from the host apparatus that indicates a timing to dynamically perform wrap-turns.

8. The method according to claim 1, wherein a position at which data writing starts is a predetermined position that follows servo data adjacent to the first end.

9. The method according to claim 1, wherein the writing the second portion of the data remaining to be written after the wrap-turn comprises writing dummy data up to a position close to the first end when an end of the data being written does not reach the first end.

10. The method according to claim 1, wherein the tape medium has a plurality of bands extending in a longitudinal direction of the tape medium, each of the bands having a plurality of wraps extending in the longitudinal direction, and wherein the writing is performed on pairs of the wraps.

11. The method according to claim 1, wherein the first and second portions of data remaining to be written after the second wrap-turn each have about a same amount of data.

12. A method, comprising:
    writing data on a tape medium in a direction from a first end toward a second end of the tape medium using a tape recording apparatus, wherein the tape recording apparatus comprises a magnetic head and is configured to record data on tape media; and
    wrap-turning a running direction of the tape medium before reaching the second end and writing a first portion of data remaining to be written when the data remaining to be written is smaller than a volume of the data to be written in one running of the tape medium so that an end of the data is written at a position close to the first end, and writing a second portion of data remaining to be written toward the first end.

13. The method according to claim 12, comprising, prior to wrap-turning the running direction of the tape medium before reaching the second end and writing a first portion of data remaining to be written:
    writing data on the tape medium in a direction from the first end toward the second end of the tape medium;
    wrap-turning a running direction of the tape medium when the magnetic head reaches the second end of the tape medium;
    writing the data on the tape medium in a direction toward the first end; and
    wrap-turning the running direction of the tape medium when the magnetic head reaches the first end and performing a subsequent data writing.

14. The method according to claim 12, wherein the first and second portions of data remaining to be written after the second wrap-turn each have about a same amount of data.

15. The method according to claim 12, further comprising:
    receiving a value of a volume of all of the data from a host apparatus; and
    calculating an amount of data remaining to be written on the tape medium from the value of the volume of all of the data.

16. The method according to claim 15, further comprising:
    receiving, using the tape recording apparatus, the value of the volume of all of the data by receiving a special command from the host apparatus along with the data.

17. The method according to claim 15, wherein the amount of data remaining to be written is calculated by taking into consideration an allowance margin for a possibility of occurrence of a write error correction.

18. The method according to claim 12, wherein a position at which data writing starts is a predetermined position that follows servo data adjacent to the first end.

19. The method according to claim 12, wherein the writing the second portion of the data remaining to be written after the wrap-turn comprises writing dummy data up to a position close to the first end when an end of the data being written does not reach the first end.

20. The method according to claim 12, wherein the tape medium has a plurality of bands extending in a longitudinal direction of the tape medium, each of the bands having a plurality of wraps extending in the longitudinal direction, and wherein the writing is performed on pairs of the wraps.

* * * * *